Patented Aug. 4, 1931

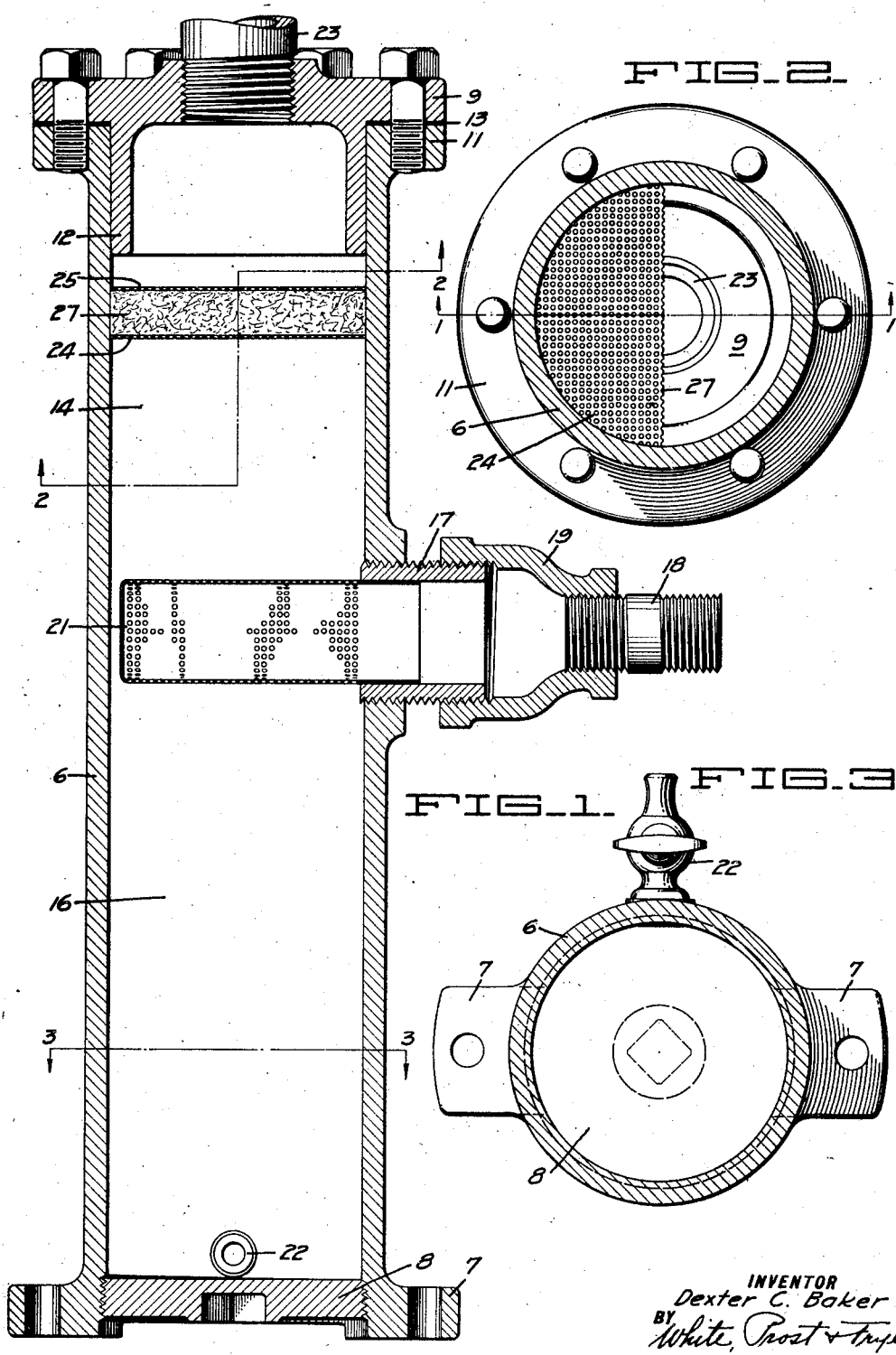

1,817,338

UNITED STATES PATENT OFFICE

DEXTER C. BAKER, OF OAKLAND, CALIFORNIA, ASSIGNOR TO BAKER-HANSEN MANUFACTURING CO., OF ALAMEDA, CALIFORNIA, A CORPORATION OF CALIFORNIA

SEPARATOR

Application filed January 26, 1927. Serial No. 163,588.

My invention relates to devices for separating foreign matter, such as oil and water, from a current of air.

There are numerous uses in industry for compressed air which is clean and dry. While the air ordinarily furnished by a compressor is sufficiently pure for general use, it usually contains moisture and oil which render its use disadvantageous in certain cases. I have therefore provided a device for separating the foreign matter, such as oil and water, from a current of air to render the air useful in every instance in which pure, uncontaminated air is desirable.

An object of my invention is to provide a means effective to separate substantially all of the contained foreign matter from a current of air.

My invention possesses other advantageous features, some of which with the foregoing, will be set forth at length in the following description where I shall outline in full that form of the separator of my invention, which I have selected for illustration in the drawings accompanying and forming part of the present specification. In said drawings I have shown one form of separator embodying my invention, but it is to be understood that I do not limit myself to such form since the invention, as set forth in the claims, may be embodied in a plurality of forms.

In the drawings:

Fig. 1 is a transverse section thru the device of my invention, the plane of section being indicated by the line 1—1 of Fig. 2.

Fig. 2 is a cross section of my device, the planes of section being indicated by the line 2—2 of Fig. 1.

Fig. 3 is a cross section of the device of my invention, with the plane of section being indicated by the line 3—3 of Fig. 1.

The separator of my invention preferably comprises a housing having an air inlet provided with means for reducing the velocity of the entering air and changing its direction of flow, and having an air outlet together with means for filtering the outgoing air.

In the preferred embodiment of the invention shown in the drawings, a metallic housing 6 is provided which is usually of generally cylindrical form and is disposed in a vertical position. The housing is flared at the bottom to provide a pair of lugs 7 by means of which the separator can be fastened to a base. A screw plug 8 is threaded into and seals the lower end of the housing while the upper end is closed by a cap 9 bolted onto a circular flange 11 at the top of the housing. The interior of the cap 9 is formed with a collar 12 extending into the housing 6 and overlying a sealing gasket 13 interposed between the cap and the flange 11.

Intermediate the ends of the housing and marking the division of its interior into an upper chamber 14 and a lower chamber 16 is a nipple 17 disposed horizontally and intersecting the housing perpendicularly. Air from the supply pipe 18 is admitted to the housing thru the nipple 17, but in order to reduce the velocity of the entering current of air, the pipe and nipple are connected by a reducer 19.

In order to break up the incoming current of contaminated air and to aid in changing its direction of flow, a cylindrical screen 21 is fitted into the outlet of the nipple 17 and extends substantially across the interior of the housing 6. The end of the screen 21 is closed and compels the incoming air to pass thru the interstices of the screen. The current of air is effectively broken up and large particles of foreign matter are entrapped. Due to the decreased velocity of the entering air current as well as to its breaking up and abrupt change of direction as it enters the interior of the housing 6, gravital separation of the air and the foreign matter contained in it takes place. Oil and water being considerably heavier than air, separate from the air and collect in the lower chamber 16. A manually operable pet cock 22 is provided by means of which the chamber 16 can be periodically drained.

While my separator is intended primarily to remove oil and water from a current of air, it is also effective in removing particles of sand, dirt and similar matter. The rapid change in direction of flow of the entering air and its reduced velocity are together instrumental in causing dirt as well as particles of liquid to precipitate gravitally into the lower chamber 16. In addition, the meshes of the screen 21, particularly after they have become moistened with oil and water, readily intercept grains of dirt.

The outlet for the air within the housing 6 is thru a pipe 23 piercing the cap 9 and in threaded engagement therewith. In flowing from the screen 21 to the outlet pipe 23, the air ascends, thereby providing further opportunity for the gravital separation of oil, water and dirt. Substantially all of the foreign matter is removed from the air when it reaches the upper chamber 14, but in order to insure that any residue is also removed from the air, I preferably provide a filtering means. The filtering means includes a pair of disc screens 24 and 25 which extend transversely of the upper chamber 14 between the walls of the housing 6. The screens 24 and 25 are spaced to enclose an intermediate body of filtering material 27, such as felt or a similar substance. Any minor residue of foreign matter is removed from the air by the filtering material. After it has passed thru the filtering means, the air is free to flow from the housing 6 thru the outlet pipe 23 to the point of use.

With the form of separator described, the collected foreign matter removed from the current of air can be drained from the device by operation of the pet cock 22, while the screen 21 and the filtering means 27 can readily be removed for cleaning or renewal, should such become necessary, and the separator if operated at or below the capacity for which it is designed will furnish air substantially free from all foreign matter.

I claim:

1. A separator comprising a housing having an inlet aperture in the side thereof, said aperture being at a material distance from the end of said housing, a screen disposed in said housing and in communication with said inlet aperture; said screen having a closed end which serves as a baffle, an inlet pipe in communication with said inlet aperture for admitting fluid to said housing at a predetermined velocity, a reducer between said inlet aperture and said inlet pipe for decreasing said velocity, an outlet aperture in an end of said housing, and a filter disposed in said housing intermediate said screen and said outlet aperture.

2. A separator comprising a substantially vertical housing having an inlet aperture in a side thereof, said inlet aperture being at a material distance from the bottom of said housing, an inlet pipe in communication with said inlet aperture for admitting fluid to said housing at a predetermined velocity, a reducer between said pipe and said aperture for decreasing said velocity, a screen substantially horizontally disposed in said housing and in communication with said inlet aperture; said screen having a closed end which serves as a baffle, an outlet aperture adjacent the top of said housing, and a filter disposed in said housing intermediate said screen and said outlet aperture.

In testimony whereof, I have hereunto set my hand.

DEXTER C. BAKER.